United States Patent
Miki et al.

[11] Patent Number: 6,101,339
[45] Date of Patent: Aug. 8, 2000

[54] CAMERA AND SYSTEM OPERATING FROM A SECONDARY BATTERY

[75] Inventors: Nobuya Miki; Hidekazu Nakajima; Yoshiyuki Mizumo; Kenji Nakamura, all of Osaka, Japan

[73] Assignee: Minolta Co., Ltd., Osaka, Japan

[21] Appl. No.: 09/288,040

[22] Filed: Apr. 8, 1999

[30] Foreign Application Priority Data

Apr. 10, 1998 [JP] Japan .................................. 10-099271
Apr. 10, 1998 [JP] Japan .................................. 10-099645

[51] Int. Cl.⁷ .................................................. G03B 7/26
[52] U.S. Cl. ........................... 396/301; 396/56; 396/277; 348/372
[58] Field of Search .................................. 396/301, 303, 396/277, 278, 56; 348/372

[56] References Cited

U.S. PATENT DOCUMENTS

| | | | |
|---|---|---|---|
| 3,853,396 | 12/1974 | Ogiso et al. | 396/301 |
| 4,091,395 | 5/1978 | Kozuki et al. | 396/303 |
| 4,329,036 | 5/1982 | Maida | 396/301 |
| 4,396,266 | 8/1983 | Goto | 396/303 |
| 4,427,280 | 1/1984 | Iwashita et al. | 396/303 |
| 4,782,355 | 11/1988 | Sakai et al. | 396/301 |
| 4,937,604 | 6/1990 | Yoshida et al. | 396/59 |
| 4,965,462 | 10/1990 | Crawford | 348/372 |
| 4,967,216 | 10/1990 | Nishio et al. | 396/303 |
| 5,073,823 | 12/1991 | Yamada et al. | 348/372 |
| 5,189,520 | 2/1993 | Okayasu et al. | 396/301 |
| 5,220,369 | 6/1993 | Sasaki | 348/372 |
| 5,387,955 | 2/1995 | Cocca | 396/56 |
| 5,721,970 | 2/1998 | Ikeda | 396/56 |
| 5,784,105 | 7/1998 | Kawamura | 348/372 |

FOREIGN PATENT DOCUMENTS

| | | |
|---|---|---|
| 63-185356 | 11/1988 | Japan . |
| 63-185357 | 11/1988 | Japan . |
| 5-199439 | 8/1993 | Japan . |
| 2510197 | 6/1996 | Japan . |

*Primary Examiner*—Russell Adams
*Attorney, Agent, or Firm*—Burns, Doane, Swecker & Mathis, LLP

[57] ABSTRACT

A camera operating from a secondary battery has a camera body, a unit including a taking lens, and a secondary battery incorporated in the unit. The secondary battery is charged by being supplied with electric power from the camera body. The unit is a lens barrel.

24 Claims, 8 Drawing Sheets

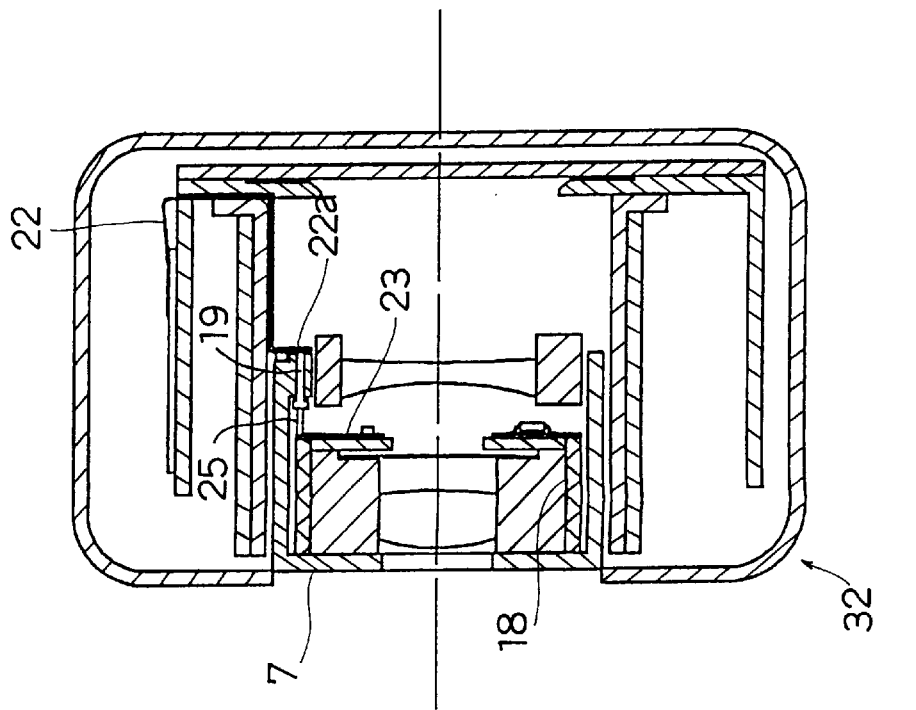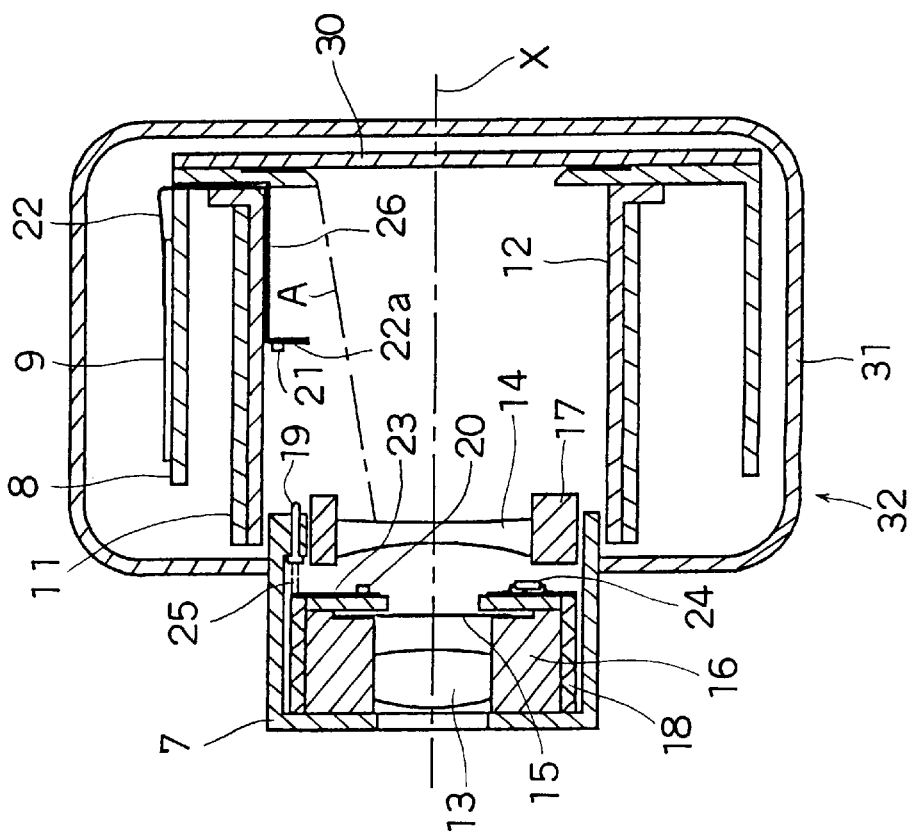

CAMERA AND SYSTEM OPERATING FROM A SECONDARY BATTERY

This application is based on applications Nos. H10-099271 and H10-099645 filed in Japan, the content of which is hereby incorporated by reference.

BACKGROUND OF THE INVENTION

1. Field of the Invention

The present invention relates to a camera and a system that operate from a secondary battery.

2. Description of the Prior Art

In recent years, lithium-ion and other technologies have brought about dramatic advancements in the field of secondary batteries, making increasingly compact and high-capacity secondary batteries viable. Nowadays, even polymer-based secondary batteries are offered for practical use, which can be used in card-sized packages or even in other freely shaped pages. Thus, it is very likely that such secondary batteries will find effective applications in cameras, which also have been made increasingly compact in these days.

On the other hand, it is customary, in digital cameras, silver-halide film cameras (for example, lens-shutter cameras), and the like, to use wires and flexible circuit boards as a means of transferring image data and of supplying electric power.

FIG. 6 is a perspective view showing the appearance of an example of a conventional digital camera. The body 1 of this camera has, on its top surface, a release button 3. The body 1 has, on one side surface, fitting holes 1a that are used to fit a lens barrel 2 to the body 1. The lens barrel 2 has, on its outer surface, fitting pins 2a that are used to fit the lens barrel 2 to the body 1. The lens barrel 2 has, inside itself, a lens 6 and a CCD (not shown here) serving as an imaging device. The body 1 and the lens barrel 2 are connected together by a cable 4.

FIG. 6 shows the state of the camera with the lens barrel 2 detached from the body 1. Even in this state, it is possible to perform shooting by pressing the release button 3 with the lens barrel 2 pointing at an object (not shown). At this time, the image formed on the CCD provided inside the lens barrel 2 through the lens 6 is, in the form of image data, transferred to the body 1 by way of the cable 4. As shown in FIG. 7, the lens barrel 2 can be attached to the body 1 by engaging the fitting pins 2a with the fitting holes 1a.

FIG. 8 shows a vertical section, as seen from a side, of an example of a lens-shutter camera taken as an example of a conventional silver-halide film camera. This camera has a lens barrel 7 for housing lenses, a camera body frame 8, a circuit board 9 for mounting electronic components, a flexible circuit board 10 for securing electrical connection between the camera body and the lens barrel 7, a rotary barrel 11, a stationary barrel 12, a first lens unit 13, a second lens unit 14, a shutter 15, a first lens frame 16 for holding the first lens unit 13, and a second lens frame 17 for holding the second lens unit 14. The camera further has a pressing plate 30 for pressing a film (not shown), and a camera body cover 31. The camera body as a whole will be identified with the numeral 32.

In FIG. 8, when the rotary barrel 11 is rotated about the optical axis X by a driving mechanism (not shown), the lens barrel 7, together with the first lens frame 16 and the second lens frame 17 fixed inside it, moves along the optical axis X. This makes it possible to perform zooming, and to retract the lens barrel when so desired. FIG. 8 shows the state of the camera with the lens barrel 7 positioned at the telephoto end. Although not shown, the first lens frame 16 incorporates the driving mechanism for the first lens unit 13 and the driving mechanism for the shutter 15. Supply of electric power to these driving mechanisms, and exchange of various signals for them between the camera body and the lens barrel, is achieved by way of the flexible circuit board 10.

For example, in response to an instruction from the camera body 32, an electric current can be fed by way of the flexible circuit board 10 to instruct the shutter 15 to be released or shut, or to instruct the first lens unit 13 to be driven for focusing. In exchange, various control signals, such as a shutter pin hole detection signal and a movable lens initial position signal, can be fed from the lens barrel 7 to the camera body 32.

However, components such as a cable and a flexible circuit board that are used to achieve exchange of signals and supply of electric power have conventionally been causing a great deal of trouble in terms of space to be secured for them and malfunction such as wire breakage associated with them. For example, the above-described conventional digital camera shown in FIGS. 6 and 7 has the advantage of permitting shooting with the lens barrel 2 freely pointing at the object irrespective of the posture of the camera, but has the disadvantage of being prone to wire breakage in the cable 4. Moreover, even when the lens barrel 2 is attached to the body 1, the cable 4, which is difficult to keep in a rest position neatly, tends to be felt as a nuisance and thus remains prone to wire breakage.

On the other hand, in the above-described conventional lens-shutter camera shown in FIG. 8, the flexible circuit board 10 is, in a front portion of the camera body 32, connected to the circuit board 9. When the lens barrel 7 is at the telephoto end as shown in FIG. 8, the flexible circuit board 10 is in a slack state, and, as the lens barrel 7 is moved inward, the flexible circuit board 10 is brought into its rest position along the inner surface of the stationary barrel 12. Inconveniently, this structure requires delicate designing so that the flexible circuit board 10, when in a slack state, will not intercept the light from the object (indicated by the letter A in FIG. 8), and in addition so that the force applied to the flexible circuit board 10 as the lens barrel 7 is moved back and forth will not cause wire breakage.

Japanese Laid-Open Utility Model Applications Nos. S63-185356 and S63-185357 propose electronic viewfinders that can be used independently even when detached from the camera body. However, these applications give no mention of how their viewfinders are supplied with electric power.

In any event, most cameras are designed to operate from a battery that is commercially available anywhere, and in particular almost all of those designed for the general public are designed to operate from a commercially available battery.

In recent years, however, the size of such batteries has been hindering further miniaturization of cameras that is eagerly sought. This is because commercially available batteries have predetermined shapes, and this imposes various restrictions on the design of cameras that employ them. Thus, it is impossible to miniaturize cameras beyond certain limits. Moreover, attempting maximum miniaturization by the use of an extremely small battery ends in permitting too few images to be shot with that battery.

On the other hand, in cases where a camera employs a secondary battery that can be recharged for repeated use from an external electric power source, the shape of the battery can be designed comparatively freely, but the battery invariably occupies as much space as corresponds to its capacity. Moreover, once the battery becomes empty, it cannot be recharged unless supplied with electric power from the wall outlet. This may lead to wasted shooting opportunities, for example, on a trip.

SUMMARY OF THE INVENTION

An object of the present invention is to provide a camera and a system that exploit a secondary battery to eliminate the use of components, such as a cable and a flexible circuit board, that are conventionally used to achieve supply of electric power and exchange of signals between the camera body and the lens barrel, and thereby eliminate the need to secure space for such components and eliminate the risk of malfunction such as wire breakage.

Another object of the present invention is to provide a camera and a system that allow a secondary battery provided therein to be recharged whenever necessary and that are compact and easy to handle.

To achieve the above objects, according to one aspect of the present invention, a system that operates from a secondary battery is provided with: a main device; a unit detachable from the main device, the unit being attached to the main device to add a predetermined function to the main device; a primary battery incorporated in one of the main device and the unit; and a secondary battery incorporated in the other of the main device and the unit. Here the primary battery is used to charge the secondary battery when the unit is attached to the main device.

According to another aspect of the present invention, a camera is provided with: a camera body; a unit including a taking lens; and a secondary battery incorporated in the unit. Here, the secondary battery is charged by being supplied with electric power from the camera body.

According to still another aspect of the present invention, a camera is provided with: a camera body; a unit including a taking lens; and a communication device for communicating data between the camera body and the unit on a wireless basis.

According to a further aspect of the present invention, a camera is provided with: a camera body; a secondary battery incorporated in the camera body; and an accessory for a camera, the accessory being detachable from the camera body and incorporating a battery serving as an electric power source. Here, the secondary battery is charged by being supplied with electric power from the battery incorporated in the accessory when the accessory is attached to the camera body.

BRIEF DESCRIPTION OF THE DRAWINGS

This and other objects and features of the present invention will become clear from the following description, taken in conjunction with the preferred embodiments with reference to the accompanying drawings in which:

FIGS. 4A and 4B are vertical sections, as seen from a side, of an example of a lens-shutter camera embodying the invention;

DESCRIPTION OF THE PREFERRED EMBODIMENTS

Hereinafter, embodiments of the present invention will be described with reference to the accompanying drawings.

Figure 1:
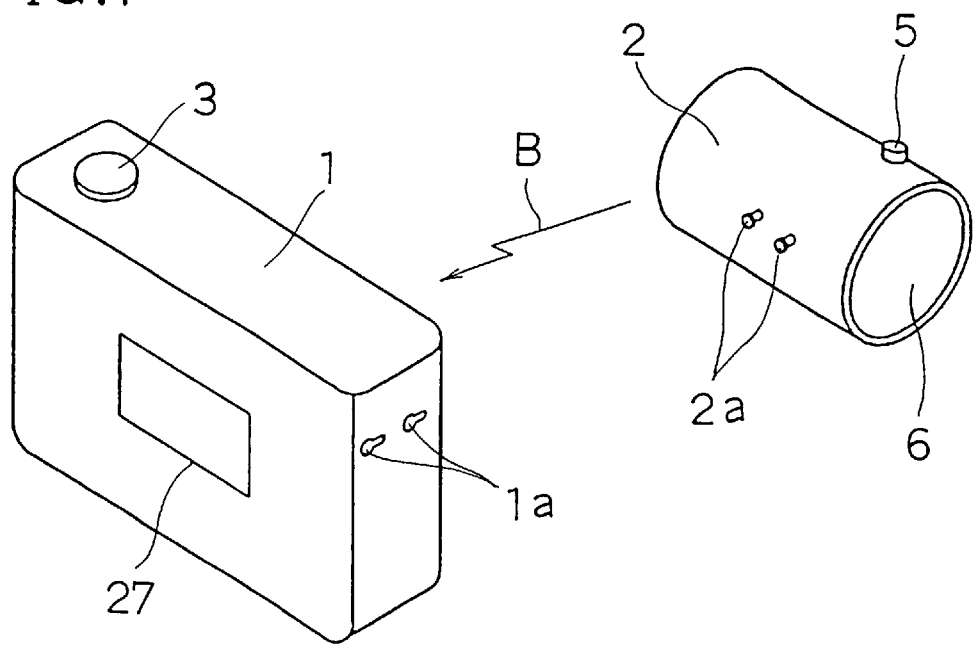
FIG. 1 is a perspective view showing the appearance of an example of a digital camera embodying the invention.

FIG. 1 is a perspective view showing the appearance of an example of a digital camera embodying the invention. The body 1 of this camera has, on its top surface, a release button 3. The body 1 has, on one side surface, fitting holes 1a that are used to fit a lens barrel 2 to the body 1. The lens barrel 2 has, on its outer surface, fitting pins 2a that are used to fit the lens barrel 2 to the body 1, and a release button 5. The lens barrel 2 has, inside itself, a lens 6 and a CCD (not shown here) serving as an imaging device. The body 1 further has, on its front or rear surface, a liquid crystal display unit 27.

Figure 2:
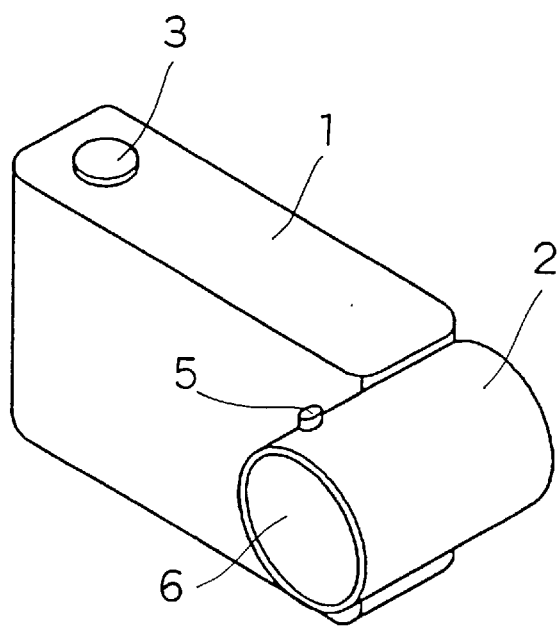
FIG. 2 is a perspective view showing the appearance of the digital camera shown in FIG. 1, with the lens barrel attached to the camera body.

FIG. 1 shows the state of the camera with the lens barrel 2 detached from the body 1, i.e. the state of the camera when wireless shooting is performed. Even in this state, it is possible to perform shooting by pressing the release button 5 with the lens barrel 2 pointing at an object (not shown); it is also possible to use instead the release button 3 provided on the body. At this time, the image formed on the CCD provided inside the lens barrel 2 through the lens 6 is, in the form of image data, transferred to the body 1 on a wireless basis as indicated by the letter B. As shown in FIG. 2, the lens barrel 2 can be attached to the body 1 by engaging the fitting pins 2a with the fitting holes 1a. Here, the fitting pins 2a serve also as electrodes so that, when the camera is in the state shown in FIG. 2, electric power is supplied from the body 1 to a secondary battery (not shown) provided inside the lens barrel 2. Note that, in FIG. 2, the liquid crystal display unit 27 is omitted.

Figure 3:
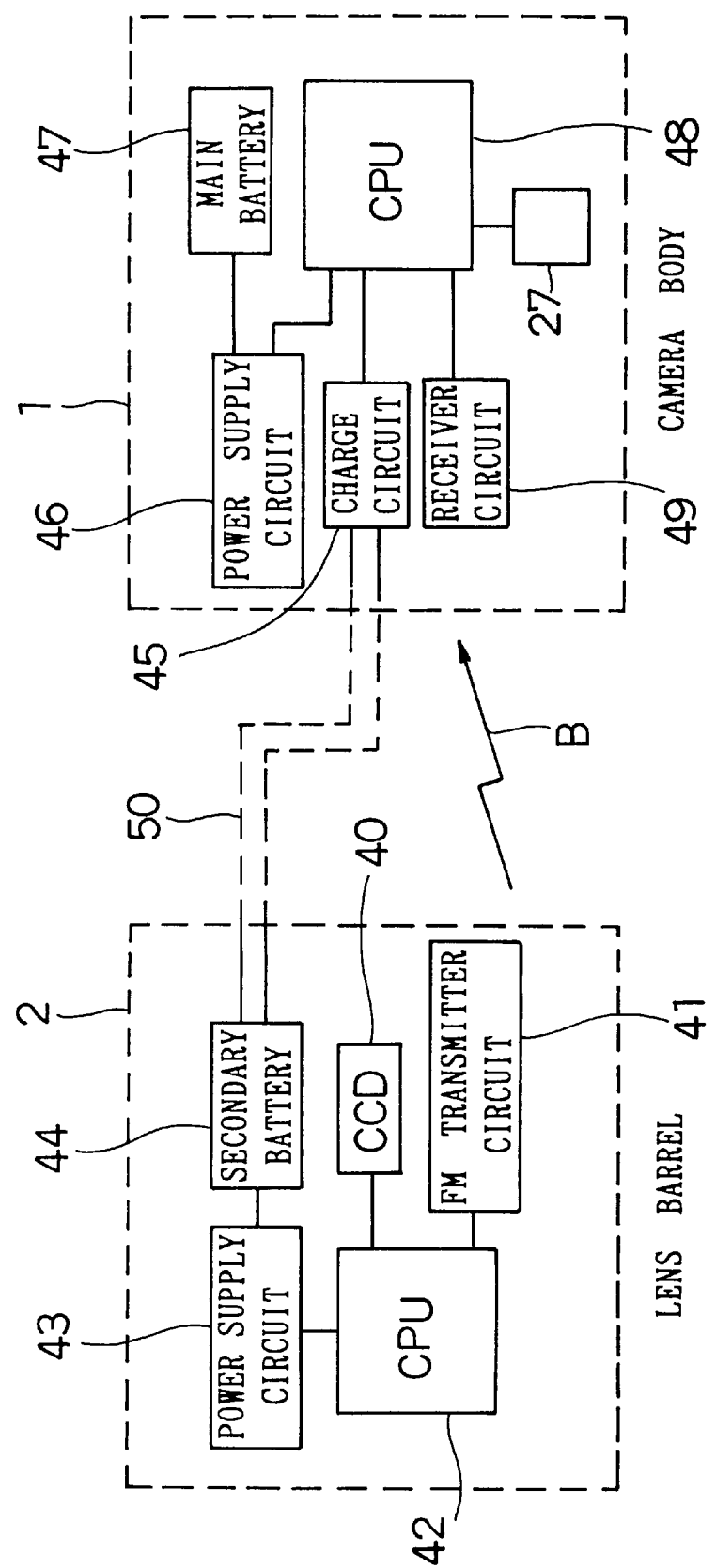
FIG. 3 is a block diagram of the circuitry used in the digital camera shown in FIGS. 1 and 2.

FIG. 3 is a block diagram of the circuitry used in this digital camera. As shown in FIG. 3, the circuitry consists of a circuit block that belongs to the body 1 and a circuit block that belongs to the lens barrel 2. The lens-barrel-side circuit block includes a CCD 40 serving as an imaging device, an FM (frequency modulation) transmitter circuit 41, a CPU 42 built, for example, as a microcomputer, a power supply circuit 43 for driving the CPU 42, and a secondary battery 44 for supplying the power supply circuit 43 with electric power. The body-side circuit block includes a charge circuit 45, a power supply circuit 46 for driving the CPU 48 mentioned later, a main battery 47 for supplying the power supply circuit 46 with electric power, a CPU 48 built, for example, as a microcomputer, and a receiver circuit 49. The liquid crystal display unit 27, which is shown also in FIG. 1, displays various items of information received from the CPU 48.

When the camera is in the state shown in FIG. 2, i.e. when the lens barrel 2 is attached to the body 1, the fitting pins 2a, through the fitting holes 1a, make contact with the circuit board (not shown) provided within the body 1. As a result, as indicated by broken lines 50 in FIG. 3, the secondary battery 44 and the charge circuit 45 are electrically connected together. In this state, it is possible to supply electric power from the main battery 47 provided within the body 1 through the power supply circuit 46 and the charge circuit 45 and then through the connection indicated by the broken lines 50 to the secondary battery 44 provided within the lens barrel 2.

During shooting, the lens barrel 2 may be kept detached from the body 1 as shown in FIG. 1. In this state, it is possible to supply electric power from the charged secondary battery 44 through the power supply circuit 43 to the CPU 42. When an image is shot, the image formed on the CCD 40 is, in the form of image data, transferred through the CPU 42 to the FM transmitter circuit 41, which then transmits the image data by FM to the receiver circuit 49 provided within the body 1 as indicated by the arrow B. The received image data is processed by the CPU 48 provided within the body 1.

Figure 9:
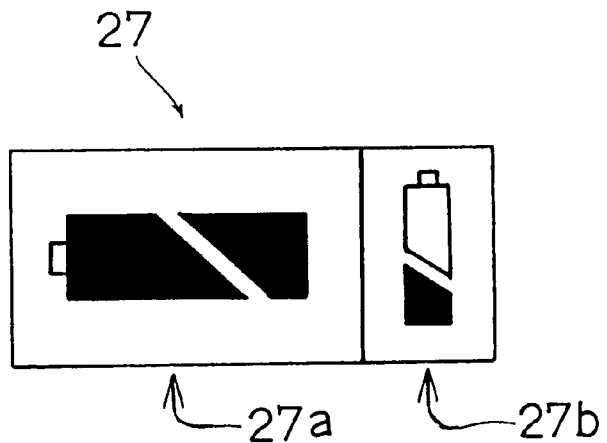
FIG. 9 is a diagram showing an example of the warning signs displayed on the liquid crystal display unit.

It is also possible to make the CPU 42 of the lens barrel 2 monitor the capacity of the secondary battery 44 and transmit information related thereto to the body 1. In accordance with this information, it is possible, for example, to indicate the remaining capacity of the secondary battery on the liquid crystal display unit 27 provided on the body 1, or indicate a warning when the remaining capacity is scarce; it is possible even to inhibit specific operations such as shutter releasing and zooming. FIG. 9 shows an example of the warning signs displayed on the liquid crystal display unit 27. Here, the remaining capacity of the battery of the body 1 and the remaining capacity of the battery of the lens barrel 2 are indicated by the proportion of the solid black portion within each of the battery signs shown in areas 27a and 27b, respectively. In this particular example, the battery of the body 1 is shown as having sufficient remaining capacity and the battery of the lens barrel 2 is shown as having little remaining capacity.

FIGS. 4A and 4B show vertical sections, as seen from a side, of an example of a lens-shutter camera taken as an example of a silver-halide film camera embodying the present invention, with FIG. 4A showing the state of the camera with the lens barrel positioned at the telephoto end and FIG. 4B showing the state of the camera with the lens barrel retracted. This camera has a lens barrel 7 for housing lenses, a camera body frame 8, a circuit board 9 provided on the camera body frame for mounting electronic components, a rotary barrel 11 provided about the optical axis X in the camera body, a stationary barrel 12 for supporting the rotary barrel 11, a first lens unit 13, a second lens unit 14, a shutter 15, a first lens frame 16 fixed inside the lens barrel 7 for holding the first lens unit 13 and the shutter 15, and a second lens frame 17 for holding the second lens unit 14. The camera further has a pressing plate 30 provided inside the camera body, in a rear portion thereof, for pressing a film (not shown), and a camera body cover 31. The camera body as a whole will be identified with the numeral 32.

The camera further has a substantially torus-shaped secondary battery 18 provided around the first lens frame 16 along the inner surface of the lens barrel 7, a contact pin 19 protruding from the rear end of the lens barrel 7, an infrared emitting/sensing device 20 provided behind the shutter 15, an infrared emitting/sensing device 21 provided in the camera body 32, a flexible circuit board 22 connected to the circuit board 9 at one end and holding the infrared emitting/sensing device 21 near the tip portion 22a of the other end, circuit components 24 for the lens barrel 7, a circuit board 23 for holding the infrared emitting/sensing device 20 and the circuit components 24, and a coil spring 25 for connecting the secondary battery 18 to the contact pin 19. The flexible circuit board 22 is held in a shape like the letter S by a plate 26 fixed to the camera body frame 8.

In FIGS. 4A and 4B, when the rotary barrel 11 is rotated about the optical axis X by a driving mechanism (not shown), the lens barrel 7, together with the first lens frame 16 and the second lens frame 17 fixed inside it, moves along the optical axis X. This makes it possible to perform zooming, and to retract the lens barrel when so desired. Although not shown, the first lens frame 16 incorporates the driving mechanism for the first lens unit 13 and the driving mechanism for the shutter 15. Exchange of various signals for these mechanisms between the camera body and the lens barrel is achieved through the infrared emitting devices 20 and 21. The infrared emitting/sensing devices 20 and 21 are so arranged as not to intercept the light from the object (indicated by the letter A in FIG. 4A).

For example, by feeding an instruction from the camera body 32 through the infrared emitting/sensing devices 20 and 21, it is possible to instruct the shutter 15 to be released or shut, or to instruct the first lens unit 13 to be driven for focusing. In exchange, various control signals, such as a shutter pin hole detection signal and a movable lens initial position signal, can be fed from the lens barrel 7 to the camera body 32 through the infrared emitting/sensing devices 20 and 21.

Moreover, as shown in FIG. 4B, as the lens barrel 7 is retracted, the contact pin 19 moves backward until it eventually makes contact with the tip portion 22a of the flexible circuit board 22. At this time, the flexible circuit board 22 and the circuit board 23 of the lens barrel 7 are connected together by way of the coil spring 25, and this makes it possible to charge the secondary battery provided in the lens barrel 7 from the camera body 32.

Figure 5:
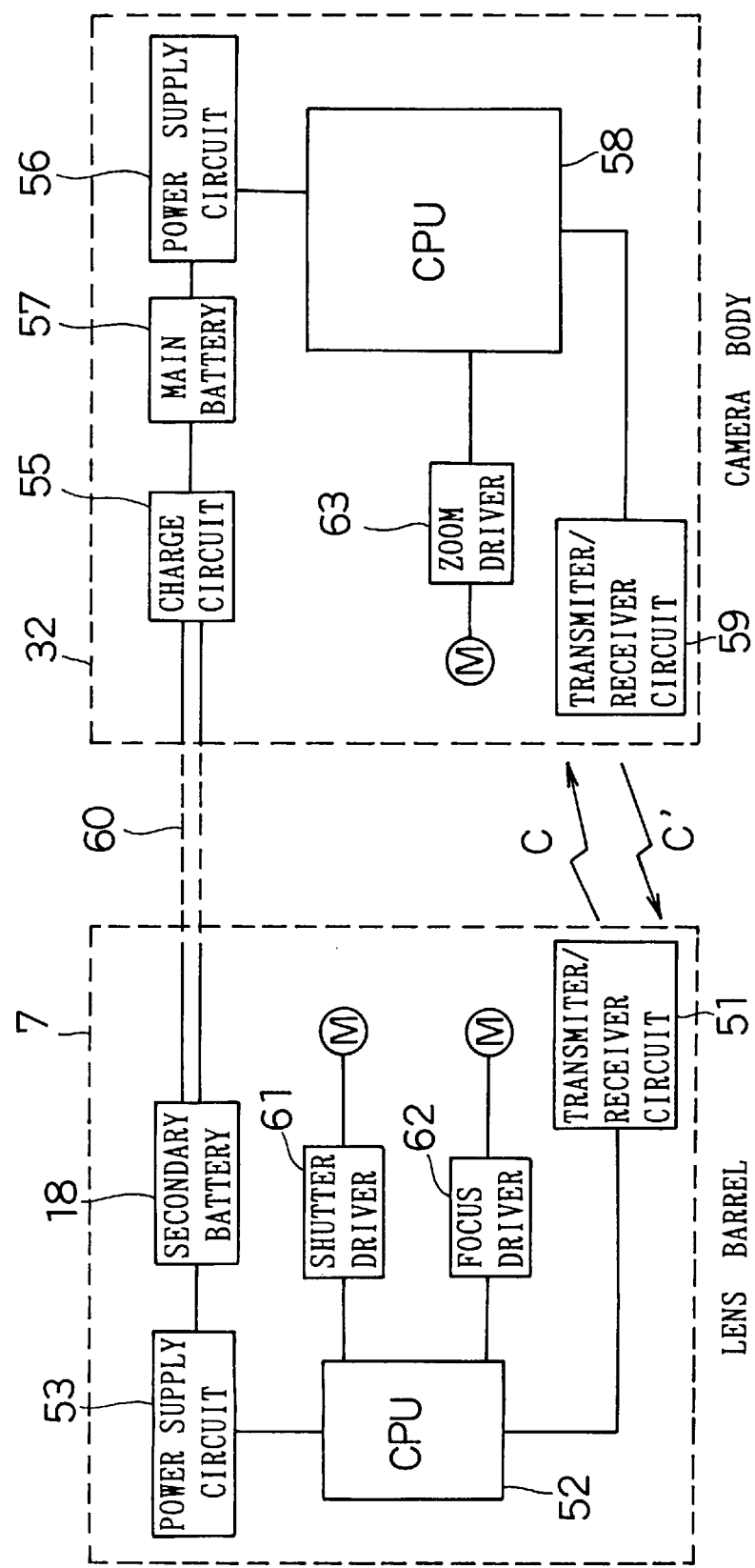
FIG. 5 is a block diagram of the circuitry used in the lens-shutter camera shown in FIGS. 4A and 4B.
Figure 6:
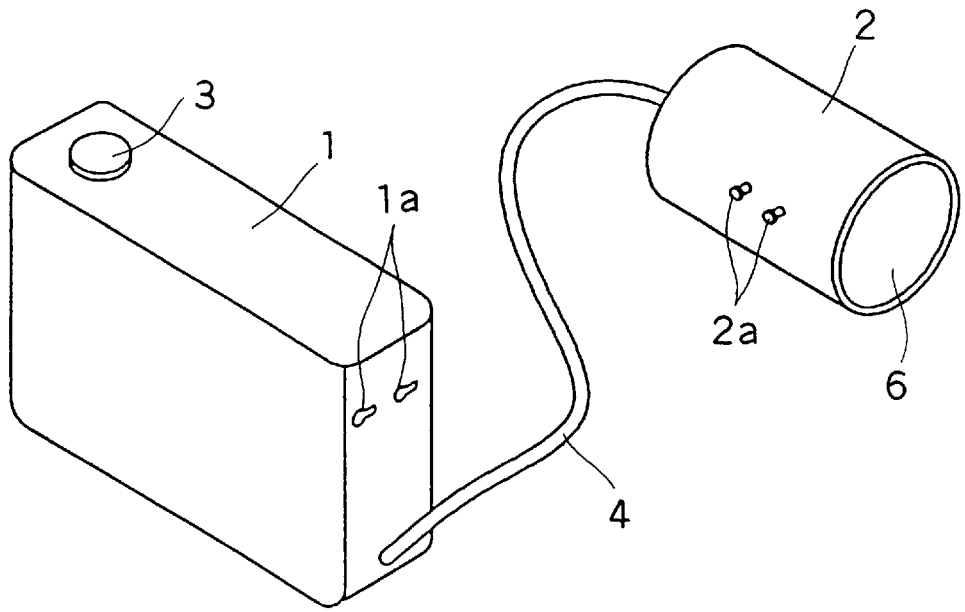
FIG. 6 is a perspective view showing the appearance of an example of a conventional digital camera.
Figure 7:
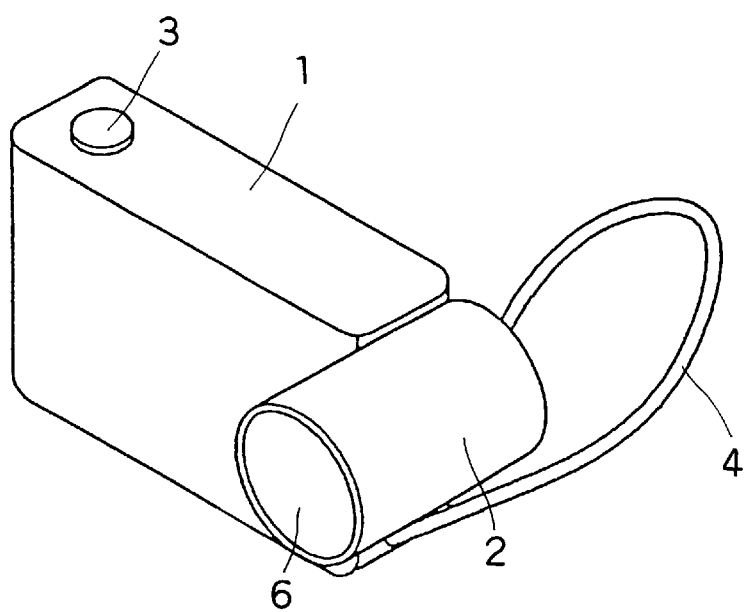
FIG. 7 is a perspective view showing the appearance of the conventional digital camera shown in FIG. 6, with the lens barrel attached to the camera body.
Figure 8:
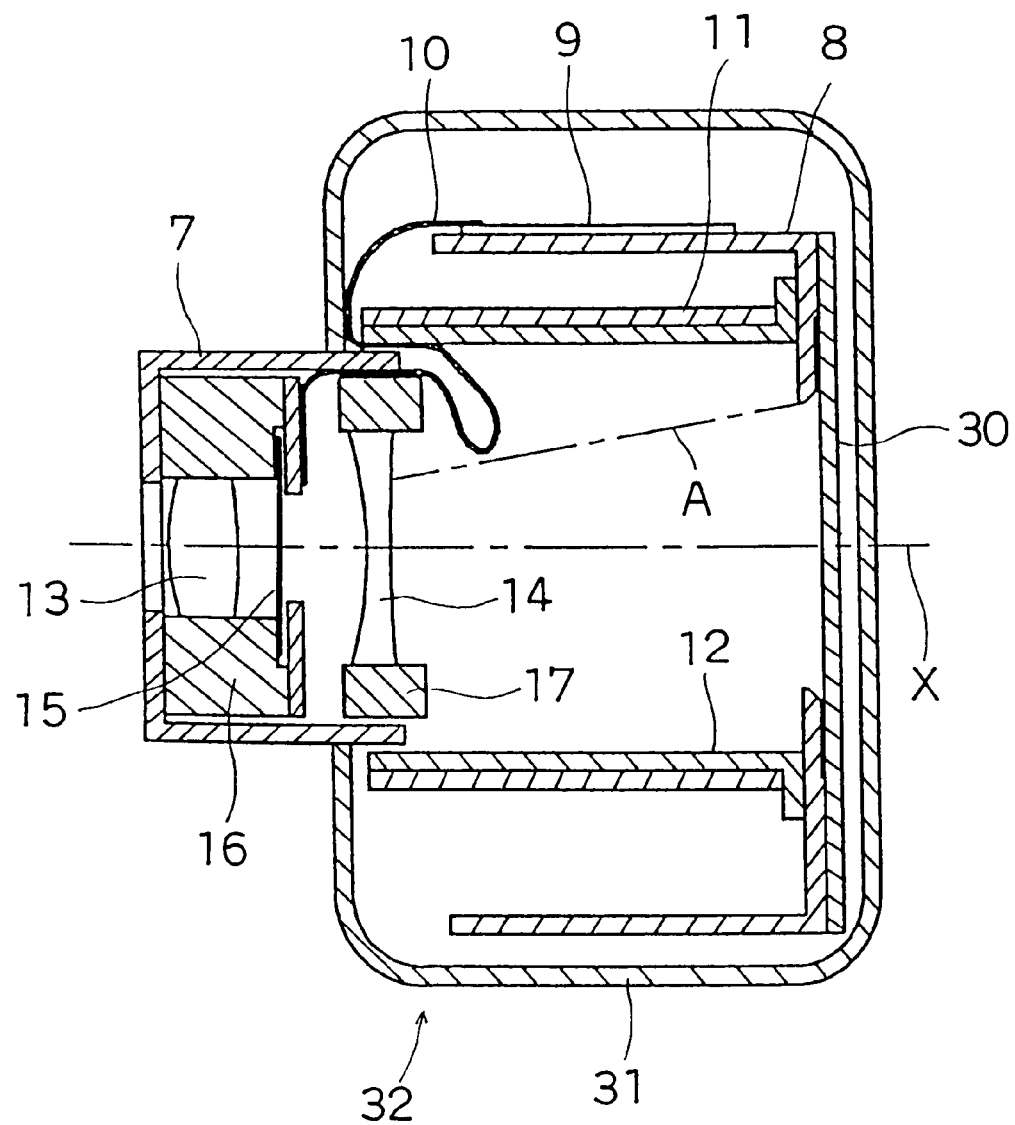
FIG. 8 is a vertical section, as seen from a side, of an example of a conventional lens-shutter camera.

FIG. 5 is a block diagram of the circuitry used in this lens-shutter camera. As shown in FIG. 5, the circuitry consists of a circuit block that belongs to the camera body 32 and a circuit block that belongs to the lens barrel 7. The lens-barrel-side circuit block includes a transmitter/receiver circuit 51, a CPU 52 built, for example, as a microcomputer, a power supply circuit 53 for driving the CPU 52, and a secondary battery 18 for supplying the power supply circuit 53 with electric power. The camera-body-side circuit block includes a charge circuit 55, a power supply circuit 56 for driving the CPU 58 mentioned later, a main battery 57 for supplying the power supply circuit 56 with electric power, a CPU 58 built, for example, as a microcomputer, and a transmitter/receiver circuit 59.

The circuitry further has a shutter driver 61 for driving the shutter 15 in response to instructions from the CPU 52, a focus driver 62 for driving the first lens unit 13 in response to instructions from the CPU 52, and a zoom driver 63 for driving the rotary barrel 11 and other related components in response to instructions from the CPU 58. Note that, in FIG. 5, the motors used as driving sources by those drivers are indicated by the letter M. Note also that the CPU 52 and other components are shown as the circuit components 24 in FIG. 4.

As described above, as the camera is brought into the state shown in FIG. 4B, i.e. as the lens barrel 7 is retracted, the contact pin 19 moves backward until it eventually makes contact with the tip portion 22a of the flexible circuit board 22. At this time, the flexible circuit board 22 and the circuit board 23 of the lens barrel 7 are connected together by way of the coil spring 25, and thus, as indicated by broken lines 60 in FIG. 5, the secondary battery 18 is electrically connected to the charge circuit 55. In this state, it is possible to supply electric power from the main battery 57 provided within the camera body 32 through the charge circuit 55 and then through the connection indicated by the broken lines 60 to the secondary battery 18 provided within the lens barrel 7.

During shooting, the lens barrel 7 is kept electrically disconnected from the camera body 32. In this state, it is possible to supply electric power from the charged secondary battery 18 through the power supply circuit 53 to the CPU 52. When a release button (not shown) is pressed, measurement of the distance and brightness of the object is performed within the camera body 32, and in related to the lens movement amount and the shutter speed is transmitted from the transmitter/receiver circuit 59 to the transmitter/receiver circuit 51 through the infrared emitting/sensing devices 20 and 21 as indicated by the arrow C'.

In response, within the lens barrel 7, the power supply circuit 53 and the CPU 52 drive the shutter driver 61 and the focus driver 62 to perform a series of operations by instructing the shutter to be released and shut and the lens barrel to be moved out. In exchange, as descried previously, various control signals, such as a shutter pin hole detection signal and a movable lens initial position signal, is transmitted from the transmitter/receiver circuit 51 to the transmitter/receiver circuit 59, i.e. to the camera body 32, through the infrared emitting/sensing devices 20 and 21 as indicated by the arrow C.

Moreover, it is also possible to make the CPU 52 of the lens barrel 7 monitor the capacity of the secondary battery 18 and transmit information related thereto from the transmitter/receiver circuit 51 to the transmitter/receiver circuit 59, i.e. to the camera body 32, through the infrared emitting/sensing devices 20 and 21 as indicated by the arrow C in FIG. 5. In accordance with this information, it is possible, for example, to indicate the remaining capacity of the secondary battery on the camera body 32, or indicate a warning when the remaining capacity is scarce; it is also possible to inhibit specific operations such as shutter releasing and zooming, or even to retract the lens barrel 7 forcibly so that the secondary battery 18 is charged when the remaining capacity is scarce.

Figure 10:
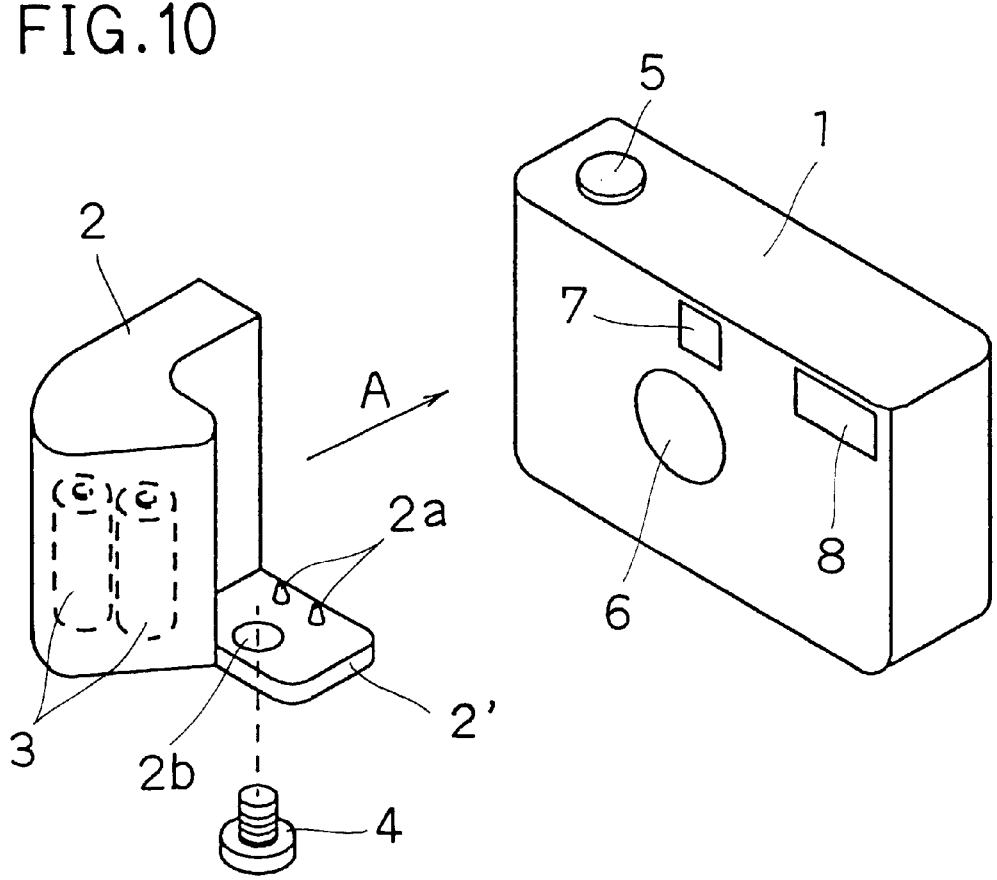
FIG. 10 is a perspective view of a camera embodying the invention, with the battery pack detached from the camera body.

FIG. 10 is a perspective view showing the appearance of a camera embodying the present invention, in its state with the battery pack detached from the camera body. This camera has a camera body 1 and a battery pack 2 formed in the shape of a camera grip and attached to the camera body 1. The battery pack 2 has a flange 2' extending sideways from its bottom, and this flange 2' has contact pins 2a extending upward from its top surface. The flange 2' also has a through hole 2b.

Inside the battery pack 2, batteries 3 are housed replaceably. The electrodes of the batteries 3 are electrically connected to the contact pins 2a. These batteries 3 serve as a primary battery, in contrast to a secondary battery (not shown in FIG. 10) provided inside the camera body 1. On the other hand, the camera body 1 has a release button 5 provided on its top surface, a lens barrel 6 provided near the center of its front surface, a viewfinder 7 provided above the lens barrel 6, and a flash 8 provided in the upper right-hand corner of its front surface.

Figure 11:
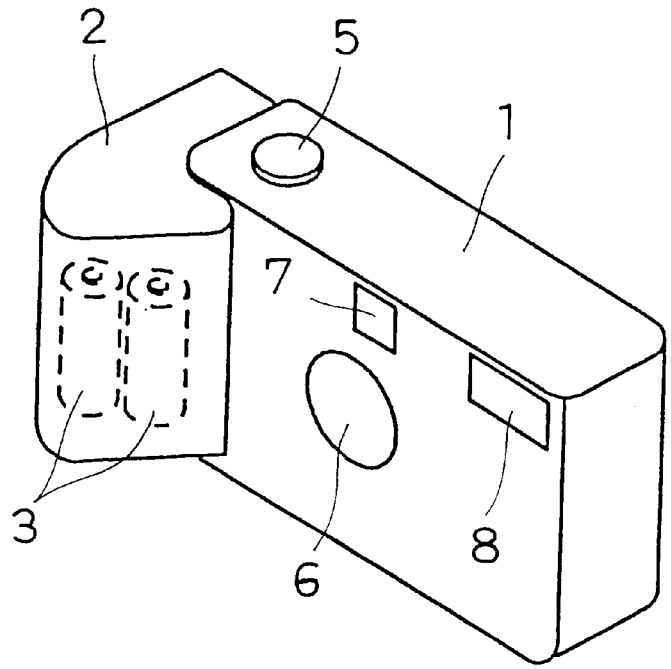
FIG. 11 is a perspective view of the camera shown in FIG. 10, with the battery pack attached to the camera body.

The battery pack 2 is attached to the camera body 1 from the direction indicated by the arrow A so that the flange 2' makes contact with the bottom surface of the camera body 1. Then, the battery pack 2 is secured in position by screw-engaging a screw 4, through the through hole 2b, with a threaded hole formed in the bottom surface of the camera body 1 specially for this purpose or for fitting a tripod. FIG. 11 is a perspective view of the same camera, in its state with the battery pack 2 attached to the camera body 1. In this state, the contact pins 2a make contact with a circuit board (not shown) provided inside the camera body 1, and this makes it possible to supply electric power from the batteries 3 to the components provided within the camera body 1. Simultaneously, the battery pack 2 serves also as a camera grip, which is otherwise provided typically as a separate camera accessory.

Figure 12:
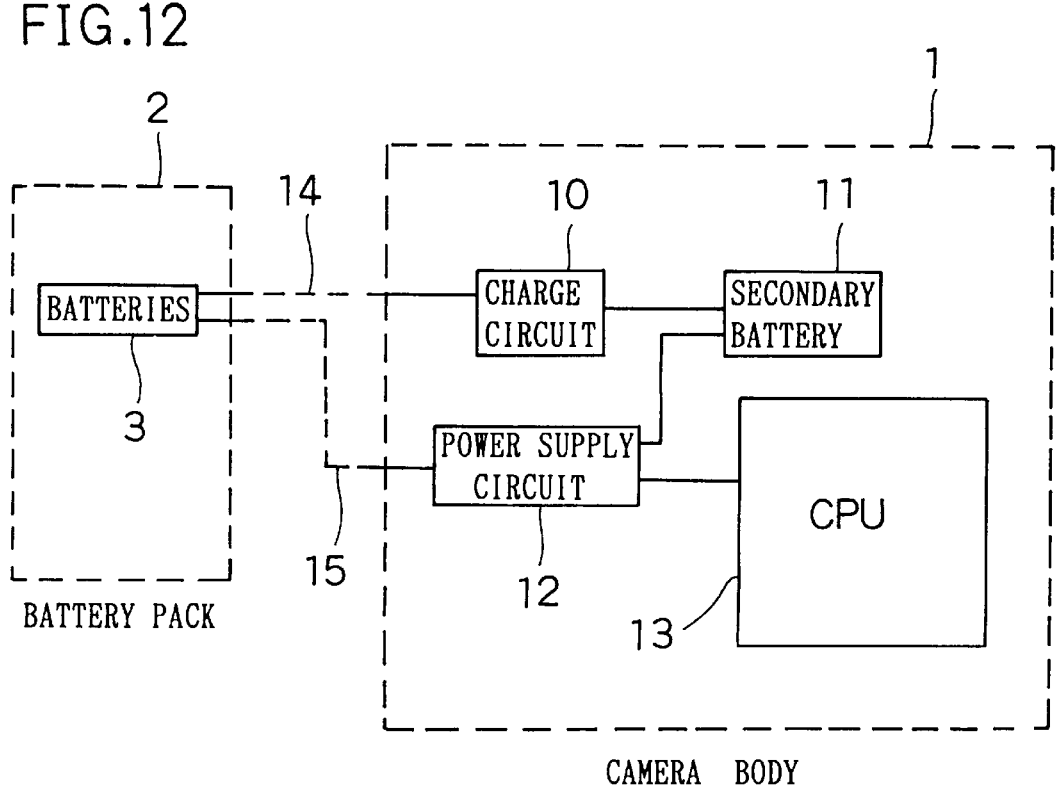
FIG. 12 is a block diagram of the circuitry used in the camera shown in FIGS. 10 and 11.

FIG. 12 is a block diagram of the circuitry used in this camera. As shown in FIG. 12, the circuitry consists of a circuit block that belongs to the camera body 1 and a circuit block that belongs to the battery pack 2. The battery-pack-side circuit block includes replaceable batteries 3. The camera-body-side circuit block includes a charge circuit 10, a CPU 13 built, for example, as a microcomputer, a power supply circuit 12 for driving the CPU 13, a secondary battery 11 for supplying the power supply circuit 12 with electric power.

When the camera is in the state shown in FIG. 11, i.e. when the battery pack 2 is attached to the camera body 1, the contact pins 2a make contact with the circuit board (not shown) provided inside the camera body 1, and thus, as indicated by broken lines 14 and 15 in FIG. 12, the batteries 3, the charge circuit 10, and the power supply circuit 12 are electrically connected together. In this state, it is possible to supply electric power from the batteries 3 housed in the battery pack 2 through the connection indicated by the broken line 14 and then through the charge circuit 10 provided within the camera body 1 to the secondary battery 11, which, too, is provided within the camera body 1.

Simultaneously, it is also possible to supply electric power from the batteries 3 through the connection indicated by the broken line 15 to the power supply circuit 12 provided within the camera body 1. In this state, when the CPU 13 recognizes that the secondary battery 11 has sufficient remaining capacity, electric power may be supplied either from the secondary battery 11 or from the batteries 3 (a primary battery); for example, in this embodiment, electric power is supplied from the batteries 3 to the power supply circuit 12 to drive the CPU 13. By contrast, when the CPU 13 recognizes that the secondary battery 11 has little remaining capacity, electric power is supplied from the batteries 3 through the charge circuit 10 to the secondary battery 11 to charge it. Similarly, when shooting is performed during charging, electric power is supplied from the batteries 3 to the power supply circuit 12 to drive the CPU 13.

On the other hand, when the camera is in the state shown in FIG. 10, i.e. when the battery pack 2 is detached from the camera body 1, or when, even though the battery pack 2 is attached to the camera body 1, the batteries 3 have no remaining capacity, electric power is supplied from the secondary battery 11 to the power supply circuit 12 to drive the CPU 13. In this state, it is possible, for example, to make the CPU 13 monitor the capacity of the secondary battery 11 so as to indicate the remaining capacity of the secondary battery on the camera body 1, or indicate a warning when the remaining capacity is scarce; it is possible even to inhibit specific operations such as shutter releasing and zooming.

Although the structure shown in FIGS. 10 and 11 is intended mainly for a lens-shutter camera, this structure can be applied also to a single-lens reflex camera. In that case, since a single-lens reflex camera is typically provided with a camera grip from the beginning, the battery pack is attached, for example, to the bottom of the camera body. Moreover, in a case as described below where an external flash is used as another type of camera accessory, it is possible to supply electric power from the flash to the primary battery provided within the camera body. This makes it possible to achieve charging from the flash without using a special accessory for charging.

Figure 13:
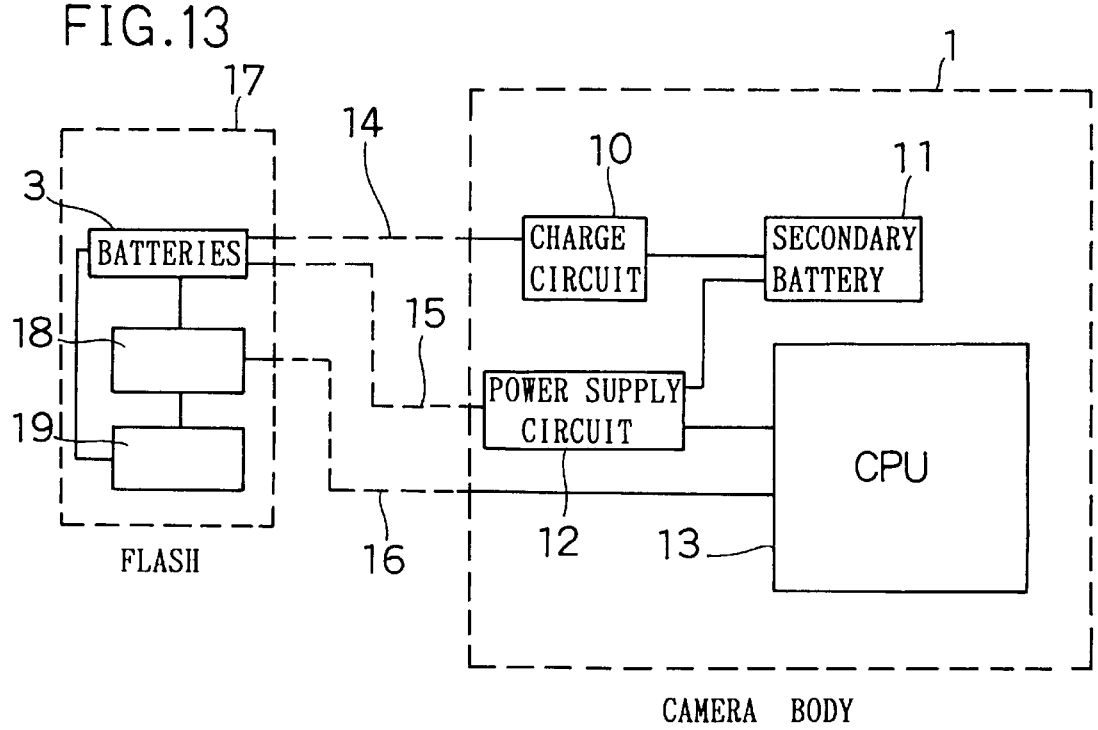
FIG. 13 is a block diagram of the circuitry used in the camera shown in FIGS. 10 and 11 when an external flash is used.

FIG. 13 is a block diagram of the circuitry used in this camera when an external flash is used. Here, the circuitry consists of a circuit block that belongs to the camera body 1 and a circuit block that belongs to the external flash 17. Each circuit block is configured largely in the same way as in FIG. 12, the main difference being the flash-side circuit block having, in addition to batteries 3, a light emission controller 18 and a light emitter 19 connected together appropriately.

When the external flash 17 is attached to the camera body 1, as indicated by broken lines 14, 15, and 16, the batteries 3, the charge circuit 10, and the power supply circuit 12 are electrically connected together, and thus the light emission controller 18 is connected to the CPU 13. In this state, it is possible to supply electric power from the batteries 3 housed in the flash 17 through the connection indicated by the broken line 14 and then through the charge circuit 10 provided within the camera body 1 to the secondary battery 11, which, too, is provided within the camera body 1.

Simultaneously, it is also possible to supply electric power from the batteries 3 through the connection indicated by the broken line 15 to the power supply circuit 12 provided within the camera body 1. Furthermore, it is naturally possible to send an instruction from the CPU 13 through the connection indicated by the broken line 16 to the light emission controller 18 to emit flash light, which is the essential function of the external flash 17. The operations performed here in terms of supply of electric power are the same as in the case described previously with reference to FIG. 12.

What is claimed is:

1. A system that operates from a secondary battery, comprising:
    a main device;
    a unit detachable from said main device, said unit being attached to said main device to add a predetermined function to said main device;
    a primary battery incorporated in one of said main device and said unit; and
    a secondary battery incorporated in the other of said main device and said unit,
    wherein said primary battery is used to charge said secondary battery when said unit is attached to said main device.

2. A system as claimed in claim 1,
    wherein said main device is a camera body,
    said unit is a lens barrel,
    said primary battery is incorporated in said camera body, and
    said secondary battery is incorporated said lens barrel.

3. A system as claimed in claim 1,
    wherein said main device is a camera body,
    said unit is a camera grip,
    said primary battery is incorporated in said camera grip, and
    said secondary battery is incorporated in said camera body.

4. A system as claimed in claim 1,
    wherein said main device is a camera body,
    said unit is a flash,
    said primary battery is incorporated in said flash, and
    said secondary battery is incorporated in said camera body.

5. A camera comprising:
    a camera body;
    a unit including a taking lens; and
    a secondary battery incorporated in said unit,
    wherein said secondary battery is charged by being supplied with electric power from said camera body.

6. A camera as claimed in claim 5,
    wherein said unit is a lens barrel.

7. A camera as claimed in claim 6,
    wherein said secondary battery is shaped substantially like a torus that extends around an inner surface of said lens barrel.

8. A camera as claimed in claim 6,
    wherein said lens barrel can be retracted relative to said camera body, and
    said secondary battery is charged when said lens barrel is retracted relative to said camera body.

9. A camera as claimed in claim 6,
    wherein said lens barrel includes a shutter that is driven by being supplied with electric power from said secondary battery.

10. A camera as claimed in claim 9, further comprising:
    a communication device for communicating a signal with which to drive said shutter between said camera body and said lens barrel on a wireless basis.

11. A camera as claimed in claim 10,
    wherein said communication device also transmits information on a remaining capacity of said secondary battery to said camera body.

12. A camera as claimed in claim 6,
    wherein said lens barrel includes a lens driver that drives said taking lens by being supplied with electric power from said secondary battery.

13. A camera as claimed in claim 12, further comprising:
    a communication device for communicating a signal with which to, drive said taking lens between said camera body and said lens barrel on a wireless basis.

14. A camera as claimed in claim 13,
    wherein said communication device also transmits information on a remaining capacity of said secondary battery to said camera body.

15. A camera as claimed in claim 5,
    wherein said unit includes an imaging device that is driven by being supplied with electric power from said secondary battery, and
    said camera further comprises a communication device for transmitting an image signal obtained from said imaging device to said camera body on a wireless basis.

16. A camera as claimed in claim 15,
    wherein said unit is detachable from said camera body.

17. A camera as claimed in claim 15,
wherein said communication device also transmits information on a remaining capacity of said secondary battery to said camera body.

18. A camera comprising:

a camera body;

a unit including a taking lens; and a communication device for communicating data between said camera body and said unit on a wireless basis.

19. A camera as claimed in claim 18, wherein said unit further includes a secondary battery, said unit is a lens barrel that can be retracted relative to said camera body, and said secondary battery is charged by being supplied with electric power from said camera body when said lens barrel is retracted relative to said camera body.

20. A camera comprising:

a camera body;

a secondary battery incorporated in said camera body; and an accessory for a camera, said accessory being detachable from said camera body and incorporating a battery serving as an electric power source, wherein said secondary battery is charged by being supplied with electric power from said battery incorporated in said accessory when said accessory is attached to said camera body.

21. A camera as claimed in claim 20, wherein said accessory is a battery pack.

22. A camera as claimed in claim 21, wherein said battery pack functions as a grip when attached to said camera body.

23. A camera as claimed in claim 20, wherein said accessory is a flash.

24. A camera as claimed in claim 20, wherein said camera body can operate by being supplied with electric power from either of said secondary battery and said battery incorporated in said accessory.

* * * * *